March 29, 1966  H. POREPP  3,243,489
METHOD OF PRODUCING SLIDE-FASTENER MEMBERS
Filed Dec. 31, 1962  3 Sheets-Sheet 1

INVENTOR.
Hans Porepp
BY
Karl F. Ross
AGENT

March 29, 1966     H. POREPP     3,243,489
METHOD OF PRODUCING SLIDE-FASTENER MEMBERS
Filed Dec. 31, 1962     3 Sheets-Sheet 2

INVENTOR.
Hans Porepp
BY
Karl F. Ross
AGENT

March 29, 1966     H. POREPP     3,243,489
METHOD OF PRODUCING SLIDE-FASTENER MEMBERS
Filed Dec. 31, 1962     3 Sheets-Sheet 3

INVENTOR.
Hans Porepp
BY
Karl F. Ross
AGENT

United States Patent Office 3,243,489
Patented Mar. 29, 1966

3,243,489
METHOD OF PRODUCING SLIDE-FASTENER MEMBERS
Hans Porepp, Essen, Germany, assignor to Opti-Holding A.G., Glarus, Switzerland, a corporation of Switzerland
Filed Dec. 31, 1962, Ser. No. 248,394
2 Claims. (Cl. 264—296)

My present invention relates to a method of producing slide fasteners of the type wherein each fastener half consists of a preferably plastic filament of meandering shape as disclosed and claimed per se in my copending application Ser. No. 246,780, filed December 24, 1962.

This application, as also the aforementioned copending one is a continuation-in-part of my prior application Ser. No. 48,477, filed August 9, 1960 and was abandoned.

The general object of this invention is to provide a simple and expeditious method of producing slide-fastener members of this type with an integral succession of generally U-shaped links formed as a continuous chain from a filament of elastically deformable material preferably molecularly oriented, thermally softenable synthetic resin such as a polyvinyl or a polyacrylate. Such plastics, when cold, exhibit a certain stiffness which is advantageous for the resilient interlinking of the fastener halves but renders the proper shaping of the filament more difficult. It is, therefore, a more specific object of this invention to provide means for temporarily maintaining the shape of a deformed plastic filament till the same can be permanently set by the application of heat.

Another specific object of this invention is to provide a method of indenting a fastener member during its formation in such manner that lateral channels are formed to receive suitable fillets (such as narrow, elongated tapes or cords) which can be used to help attach the fastener member to a supporting strip of fabric or the like.

In accordance with this invention I progressively and intermittently advance the as yet undeformed filament along a predetermined path between a pair of cooperating dies with mating sinuous formations which are periodically displaced toward a central plane so as to engage a portion of the advancing filament and to bend it into an undulating section. While the filament is still held by the dies, i.e. prior to separation of the latter, it is laterally clamped to maintain the undulating shape of the section just formed, whereupon a set of projections carried by a supporting member are laterally introduced into the loops of that section (and also, generally, into adjoining loops of one or more sections previously formed in like manner) so as to hold these loops engaged while the clamping force is released to enable the filament to proceed along its path. Advantageously, this clamping force is supplied by a spring-urged pressure plate which can be pushed out of contact with the undulating filament sections by the inserted projections of the supporting member, this member traveling along a circuit which causes the loop-engaging projections to move for a limited distance over the guide path of the filament so that the latter is longitudinally entrained. Further along this guide path I provide means for bending the undulating sections into U shape about the aforementioned central plane, advantageously in a region which is heated to a level sufficient to relax the deformed material and to let it set in the shape now imparted to it. I also prefer to provide, just ahead of the final bending and heating means, one or more tools synchronized with the other components of the apparatus for deforming the leg portions of the loops of each undulating section so as to provide them with centrally positioned flattened heads and/or with incisions to receive the aforementioned fillets.

The above and other objects, features and advantages of this invention will become more fully apparent hereafter in the detailed description, reference being made to the accompanying drawing in which:

FIG. 8 is a side-elevational view of a length of fastener member produced by the apparatus of FIGS. 1–7, together with a strip of fabric straddled thereby and secured to it through a pair of fillets;

FIG. 9 is a cross-sectional view taken on line IX—IX of FIG. 8;

FIG. 10 is a perspective view of the fastener member, supporting strip and fillets shown in FIGS. 8 and 9;

Figure 1:
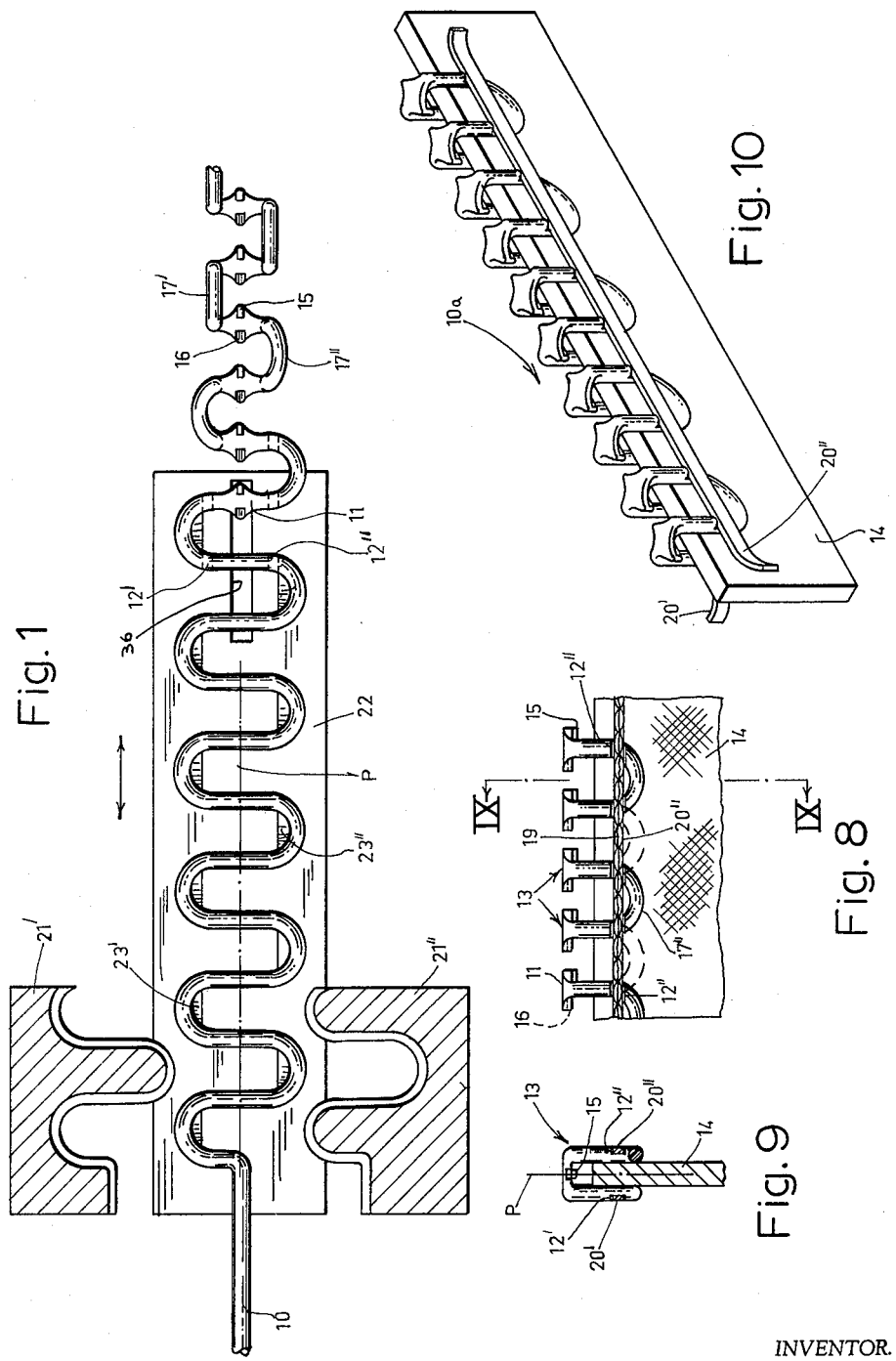
FIG. 1 is a somewhat diagrammatic elevational view, partly in section, of a filament passing through an apparatus according to this invention in the process of being formed into a slide-fastener member.

In FIG. 1 I have shown a filament 10 of plastic material which, in a manner fully described hereinafter, is being bent into undulating planar shape and then deformed so as to exhibit flattened enlargements 11 along its axis. At substantially the same time there are formed incisions 12', 12" in each undulation on opposite sides of the enlargements 11. Next, as best seen in FIG. 8, the undulating filament 10 is bent about its central plane P (see also FIG. 9) so as to form a series of generally U-shaped links which straddle a strip of fabric 14 (FIGS. 8–10), each enlargement 11 being disposed at the bight of the U of a respective link and spaced from the strip edge so as to form one of a series of longitudinally separated heads by which the resulting fastener member 10a coacts with a similar fastener member on another strip (not shown); the spacing of the heads is, for this purpose, somewhat less than their width as measured in the longitudinal direction of the fastener. Advantageously, in order to secure the two fastener members against relative transverse displacement upon their interengagement, the heads are provided with complementary formations, such as projections 15 and indentations 16, which interlock with those of the other fastener member when the two members are brought into mesh by the usual slider action. It will be noted that the limbs 17', 17" of the fastener, by which successive links 13 are interconnected, extend below the edge of fabric 14 so as to define a guide path for the conventional slider which has not been illustrated. A pair of fillets 20' and 20" in the shape of narrow tapes, received in the aligned notches 12' and 12", lie above this guide path so as to be kept out of contact with the reciprocating slider. Stitching 19, passing through the fillets 20' and 20" and the strip 14 between the successive links 13, serves at attach these fillets to the strip and thereby to hold the fastener member 10a in place.

The means for undulating the filament 10 and initially maintaining its shape include a pair of dies 21', 21" and a supporting plate 22 which carries two sets of studs 23', 23" projecting transversely to the plane of the undulations. As illustrated in FIGS. 2–6, the apparatus preferentially used to carry out the progressive deformation illustrated in FIG. 1 comprises an elongated housing in the form of a bar 24 of rectangular cross-section with an internal channel 25 which is of substantially constant rectangular cross-section over the first part of its length (FIGS. 3–5) and then gradually changes into a shape conforming to the outline of the meandering fastener member 10a. The studs 23', 23" are aligned with slots 26', 26" in the left-hand wall (FIGS. 3 and 4) of bar 24 in which they are displaceable along a narrowly looped circuit by an operating mechanism best illustrated in FIG. 7. This mechanism includes a pair of parallel crank shafts 27a and 27b which are journaled in fixed bearings 28a, 28b and driven in unison via a pair of sprockets 29a, 29b interconnected by a chain 30. The chain 30 is rotated continuously from a power source shown in FIG. 2 as a motor 31 whose connection with the drive 29a, 29b, 30 has been indicated diagrammatically at 32; the same motor operates the dies 21', 21", in timed relationship with the chain 30, via a transmission diagrammatically illustrated at 33. It will be apparent that the crank shafts 27a and 27b constitute a parallelogrammatic linkage whereby the plate 22 is always displaced parallel to itself so as first to introduce the studs 23', 23" into the loops formed in filament 10, such introductions occurring upon the separation of dies 21' and 21" as illustrated in FIG. 1, then to advance these studs and with them the filament in the direction of its axis and thereafter to withdraw the studs from the loops whereupon the studs return to their initial positions aligned with the undulations of the sinuous dies 21', 21".

Figure 3:
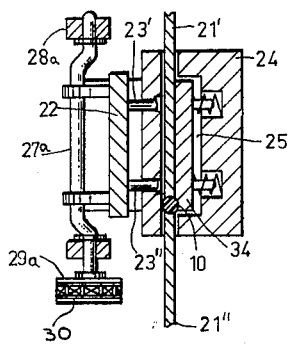
FIGS. 3, 4, 5 and 6 are cross-sectional views taken along lines III—III, IV—IV, V—V and VI—VI, respectively, of FIG. 2.
Figure 4:
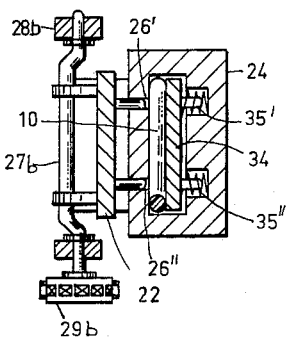
Figure 5:
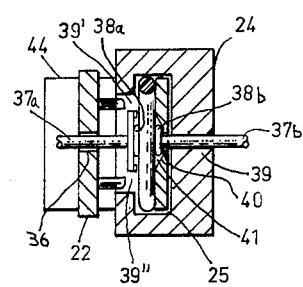

For the maintenance of the undulating shape of the filament in the withdrawn position of studs 23', 23", I provide a pressure plate 34 which is lodged in the rectangular portion of channel 25 and is transversely displaceable therein, under pressure of two or more pairs of springs 35', 35", toward the undulating filament so as to clamp it against the apertured left-hand wall of bar 24. It will be noted from FIG. 3 that the dies 21', 21" are slightly narrower than the filament 10 deformed therebetween so that the clamping action takes place even during the operation of the dies. When the studs 26', 26" enter the loops of the filament after having been withdrawn therefrom as illustrated in FIGS. 3–5, they push the pressure plate 34 to the right whereby the undulating filament section last formed, along with preceding sections, is released for longitudinal entrainment by these studs within channel 25. Plate 34 is somewhat longer than plate 22 so as to confront the latter throughout its range of longitudinal reciprocation.

The supporting plate 22 is centrally slotted at 36 (FIG. 5) to accommodate the stem 37a of a deforming tool 38a which cooperates with a similar tool 38b whose stem 37b traverses a bore 39 in bar 24 as well as an aligned bore 40 in plate 34; tool 38b is receivable in a recess 41 of the latter plate. The two tools 38a, 38b serve to flatten a central portion of each undulation to form the enlargements 11 (FIGS. 1 and 8), tool 38a also having prongs 39', 39" which at the same time produce the incisions 12', 12" in the legs of the undulations. The tool stems 37a, 37b are alignedly reciprocated, in a direction transverse to the plane of the loops, by the motor 31 under the control of a transmission shown in FIG. 2 to include a pair of cranks 42a, 42b lodged in bearings 43a, 43b. It will be noted that the slots 26', 26" of bar 24 are interconnected in the region of stem 37a to admit the tool 38a.

Figure 6:
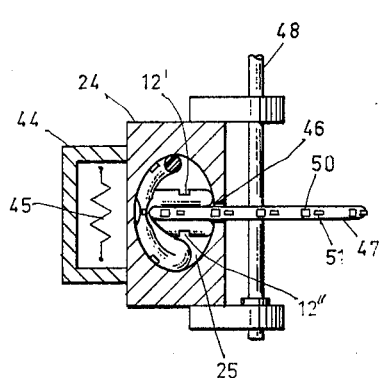

Beyond the tool position illustrated in FIG. 5, i.e. in the region in which channel 25 progressively changes its shape, there is provided a heater 44 open toward the left-hand side of bar 24, this heater containing one or more resistance elements 45 as illustrated schematically in FIG. 6. In the opposite, right-hand wall of bar 24 there is formed a central slot 46 through which projects a disk 47 rotatable about a shaft 48; this shaft is driven by motor 31, in synchronism with the other operating assemblies, via a transmission diagrammatically illustrated in FIG. 2 at 49. As the undulating filament 10 is progressively advanced through channel 25 by the mechanism described above, it is gradually folded about the aforementioned central plane P which is also the plane of disk 47. The thickness of this disk is so selected as to afford just sufficient clearance between the disk and the upper and lower walls of channel 25, when the latter has reached its final cross-sectional shape, to accommodate the U-shaped links 13 (see FIG. 9) of the meander 10a into which the filament is being converted; the incisions 12' and 12" previously formed in the filament by the prongs 39', 39" now appear on the outside of the legs of each U. Disk 47 may also be provided with peripheral recesses 50 and teeth 51 in order to form the projections 15 and the indentations 16, respectively. The stresses created in filament 10 by the shaping operations illustrated in FIGS. 3, 5 and 6 are relieved by the heater 44 so that the meandering fastener member retains the shape last given to it. It will be apparent that heater 44 is disposed close enough to the location of tools 38a, 38b to maintain the filamentary material in a thermally softened state while the incisions 12', 12" and the heads 11 are being formed therein.

The filament 10 is initially supplied from a reel 52 through a fixed orifice 53, a pair of feed rollers 54', 54" powered by motor 31 and synchronized via meshing gears 55' and 55", and another fixed orifice 56 beyond which I prefer to station a pair of cutting knives 57a, 57b just ahead of the dies 21', 21". These knives, designed to sever predetermined lengths of filament for the formation of measured fastener halves 10a, are actuatable by respective solenoids 58a, 58b under the control of a timer driven by feed motor 31. This timer is here shown to comprise a tape 59 of insulating material (e.g. paper) through which power from a voltage source 60 (here shown as a battery) is periodically applied to the solenoids 58a, 58b via a point electrode 61 positioned to contact a counterelectrode 62 through a slot 63 in the tape. Another slot 64, cooperating with another point electrode 65, serves to deactivate a magnetic clutch 66' in timed relationship with the operation of cutters 57a, 57b so as to decouple the feed rollers 54', from motor 31, thereby arresting the filament 10 during and just after the operation of the cutters. The finished fastener half 10a, emerging from the channeled bar 24, straddles a guide strip 66 on its way to the operating plate 67 of a conventional sewing machine whose needle has been illustrated at 68; the stringer tape 14, coplanar with the guide strip 66, is fed onto the work plate 67 so as to be straddled by the links of the fastener member 10a preparatorily to a stitching of that member onto the tape. This stitching may be accomplished with the aid of fillets, not shown in FIG. 2, as heretofore described with reference to FIGS. 8–10.

Figure 11:
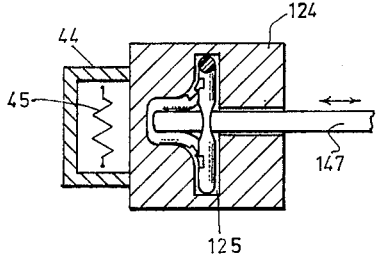
FIG. 11 is a view generally similar to FIG. 6, illustrating a modification of the shaping means.

FIG. 11 shows a modification of the bending stage of my apparatus in which the disk 47 of FIG. 6 is replaced by a reciprocable bar 147 which drives the central portion of the filament toward the left-hand wall of the bar 124 having a suitably modified channel 125. The reciprocations of pusher bar 147 are, of course, synchronized with the operations of the dies and the deforming tools in the same manner as has been described with reference to disk 47.

Figure 2:
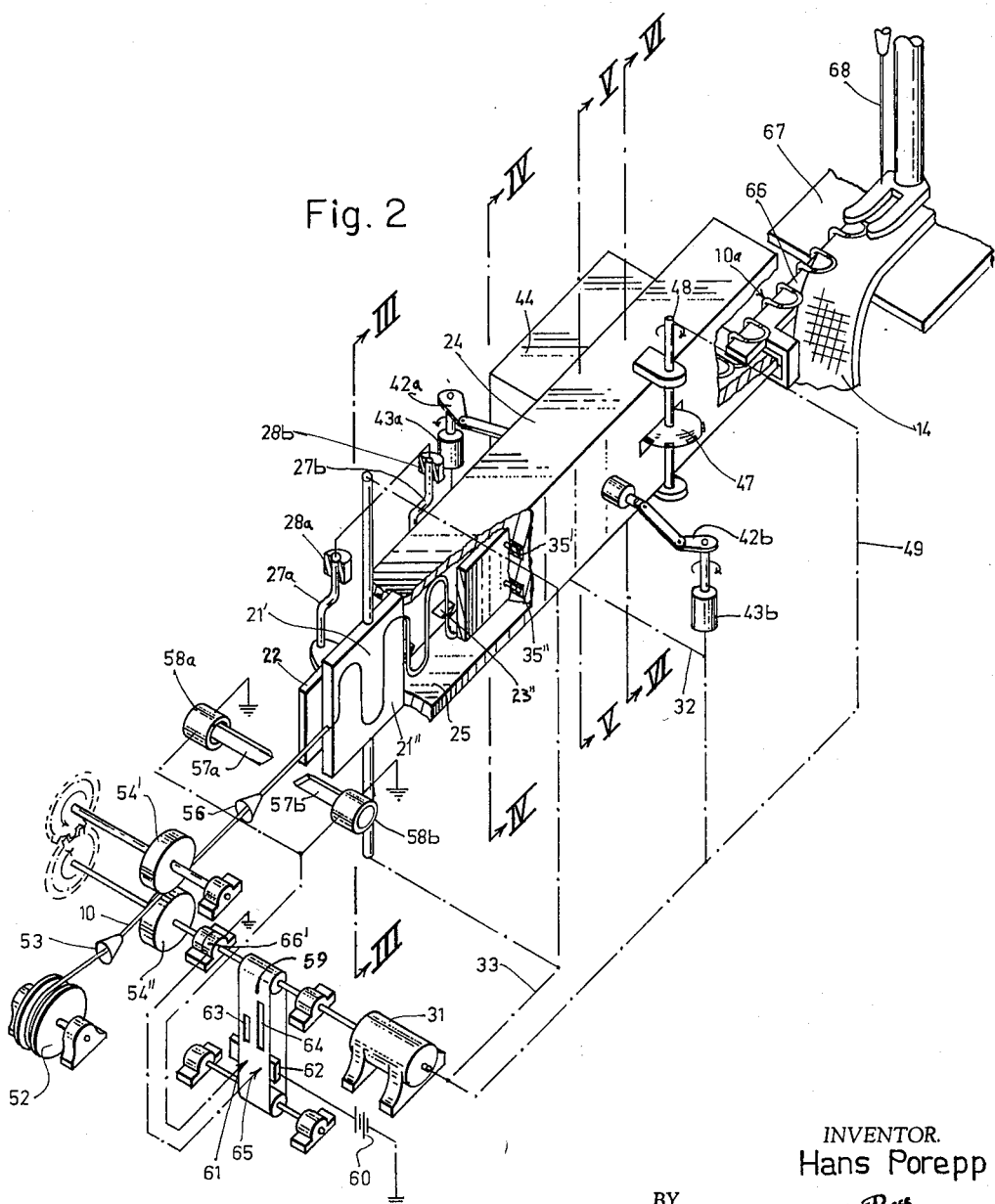
FIG. 2 is a perspective view (parts broken away) of the apparatus, shown again somewhat diagrammatically.
Figure 7:
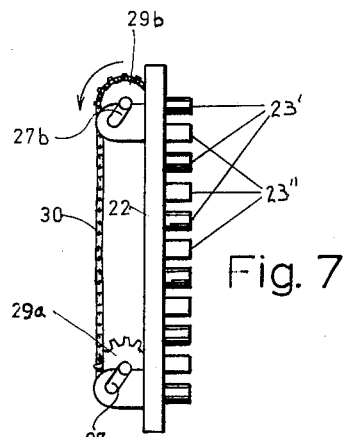
FIG. 7 is a top view of a part of the apparatus illustrated in FIGS. 2–5.
Figure 12:
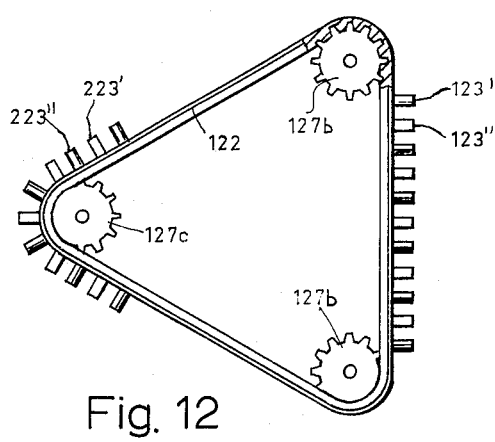
FIG. 12 is a view generally similar to FIG. 7, illustrating an alternative feed system.

Another modification has been illustrated in FIG. 12 in which the conveying mechanism shown in FIG. 7 has been replaced by an endless band 122 bearing two sets of studs 123', 123" and 223', 223". The tape 123 is supported by sprockets 127a, 127b, 127c of which at least one is coupled with motor 31 (FIG. 2). It will be apparent that the studs 123', 123" and 223', 223" operate in substantially the same manner as do the studs 23', 23" of FIGS. 2–7.

Modifications of the specific structure described and illustrated are, of course, possible and will be readily apparent to persons skilled in the art, such modifications being intended to be embraced within the spirit and scope of the invention as defined in the appended claims.

I claim:
1. A method of producing slide-fastener members, comprising the steps of progressively shaping successive portions of an elongated flexible element by iterative transverse deformation into planar undulating sections with at least one loop on each side of a center line, flattening each undulating section in the region of said center line immediately upon its formation to form a plurality of equispaced heads separated by a distance less than their width substantially concurrently incising each loop so formed for, producing therein a pair of aligned indentations offset from said center line, progressively bending the sections so deformed and indented into U shape with said indentations defining a pair of lateral channels on a meandering structure, progressively bringing said structure into straddling engagement with an edge of a stringer tape, and progressively fastening said structure onto said tape by stitching within said channels immediately upon the formation of said structure.

2. A method of producing slide-fastener members, comprising the steps of progressively shaping successive portions of a plastic thread by iterative transverse deformation into planar undulating sections with at least one loop on each side of a center line, flattening each undulating section in the region of said center line immediately upon its formation to form a plurality of equispaced heads separated by a distance less than their width, substantially concurrently incising each loop so formed for producing therein a pair of aligned indentations offset from said center line, progressively bending the sections so deformed and indented transversely into U shape with said indentations defining a pair of lateral channels on a meandering structure heating said sections for maintaining them in their bent state, progressively bringing said structure into straddling engagement with an edge of a stringer tape, and progressively fastening said structure onto said tape by stitching within said channels immediately upon the formation of said structure.

References Cited by the Examiner

UNITED STATES PATENTS

| | | | |
|---|---|---|---|
| 2,686,338 | 8/1954 | Morin | 18—12 |
| 2,903,745 | 9/1959 | Hansen | 264 |
| 2,919,482 | 1/1960 | Casson | 24—205 |
| 2,974,372 | 3/1961 | Yoshida | 18—56 |
| 3,054,149 | 9/1962 | Streicher | 18—56 |
| 3,069,721 | 12/1962 | Arni et al. | 18—12 |

ROBERT F. WHITE, *Primary Examiner.*

MORRIS LIEBMAN, *Examiner.*